United States Patent
Huang et al.

(10) Patent No.: US 10,660,174 B2
(45) Date of Patent: May 19, 2020

(54) SOLID STATE LUMINAIRE WITH FIELD-CONFIGURABLE CCT AND/OR LUMINOSITY

(71) Applicant: Cree, Inc., Durham, NC (US)

(72) Inventors: Jen Huang, Cary, NC (US); P. Joseph DeSena, Jr., Raleigh, NC (US); Mark Boomgaarden, Cary, NC (US)

(73) Assignee: IDEAL Industries Lighting LLC, Durham, NC (US)

( * ) Notice: Subject to any disclaimer, the term of this patent is extended or adjusted under 35 U.S.C. 154(b) by 0 days.

(21) Appl. No.: 16/161,723

(22) Filed: Oct. 16, 2018

(65) Prior Publication Data

US 2020/0120770 A1 Apr. 16, 2020

(51) Int. Cl.
*H05B 45/20* (2020.01)
*F21S 4/10* (2016.01)
*H05B 45/37* (2020.01)
*H05B 47/19* (2020.01)

(52) U.S. Cl.
CPC ............ *H05B 45/20* (2020.01); *F21S 4/10* (2016.01); *H05B 45/37* (2020.01); *H05B 47/19* (2020.01)

(58) Field of Classification Search
None
See application file for complete search history.

(56) References Cited

U.S. PATENT DOCUMENTS

| | | | | |
|---|---|---|---|---|
| 8,587,205 B2* | 11/2013 | Ter Weeme | ........ | H05B 33/0815 315/185 R |
| 9,894,740 B1* | 2/2018 | Liszt | ........... | H05B 37/0272 |
| 10,039,175 B1* | 7/2018 | Thornton | ........... | H05B 33/0863 |
| 10,165,635 B1* | 12/2018 | Bradford | ........... | G05F 1/46 |
| 2007/0115228 A1* | 5/2007 | Roberts | ........... | G09G 3/3413 345/82 |
| 2009/0295776 A1* | 12/2009 | Yu | ........... | H05B 33/0818 345/212 |
| 2010/0148697 A1* | 6/2010 | Bayat | ........... | F21L 4/027 315/294 |
| 2010/0277410 A1* | 11/2010 | You | ........... | G09G 3/3413 345/102 |
| 2013/0038222 A1 | 2/2013 | Yeh et al. | | |
| 2013/0322082 A1* | 12/2013 | Hollander | ........... | F21S 2/005 362/249.02 |
| 2014/0001972 A1* | 1/2014 | Harris | ........... | H05B 33/0842 315/200 R |

(Continued)

*Primary Examiner* — Crystal L Hammond
(74) *Attorney, Agent, or Firm* — Coats & Bennett, PLLC

(57) ABSTRACT

A single solid state luminaire product is field-configurable to a plurality of discrete coordinated color temperature (CCT) and maximum luminosity settings. A field-actuated control circuit controls a current ratio control circuit, which directs drive current from a power supply to selected ones, or in selected ratios to multiple ones, of heterogeneous LED strings. The control circuit may also control the power supply, to select an overall maximum level of drive current, which determines the maximum luminosity of the luminaire. In one embodiment, inputs to the field-actuated control circuit are input from exterior to the luminaire product packaging. Embodiments allow a distributor to order and stock a large inventory of substantially identical luminaires from the manufacturer, yet still offer customers a variety of different CCT and maximum luminosity products.

22 Claims, 6 Drawing Sheets

(56) References Cited

U.S. PATENT DOCUMENTS

| | | | |
|---|---|---|---|
| 2014/0042920 A1 | 2/2014 | Chou | |
| 2014/0042933 A1* | 2/2014 | Livschitz | H05B 33/0848 315/307 |
| 2014/0049172 A1* | 2/2014 | Bakk | H05B 33/0863 315/192 |
| 2014/0070710 A1* | 3/2014 | Harris | H05B 33/0809 315/185 R |
| 2014/0159612 A1* | 6/2014 | Tong | H01L 25/0753 315/297 |
| 2014/0167653 A1* | 6/2014 | Chobot | H05B 37/029 315/362 |
| 2014/0210357 A1 | 7/2014 | Yan et al. | |
| 2014/0210361 A1* | 7/2014 | Ferrier | H05B 33/0812 315/186 |
| 2014/0239884 A1* | 8/2014 | Koike | H02J 7/0034 320/107 |
| 2015/0008831 A1* | 1/2015 | Carrigan | H05B 37/0227 315/153 |
| 2015/0015145 A1* | 1/2015 | Carrigan | H05B 37/0272 315/131 |
| 2015/0092259 A1* | 4/2015 | Greer | G02F 1/163 359/275 |
| 2015/0351169 A1* | 12/2015 | Pope | H05B 33/086 315/193 |
| 2015/0373790 A1* | 12/2015 | Boswinkel | H05B 33/083 315/186 |
| 2016/0234895 A1* | 8/2016 | Delos Ayllon | H05B 33/0815 |
| 2017/0231055 A1* | 8/2017 | Yadav | H05B 33/0809 |
| 2017/0354021 A1* | 12/2017 | Dimberg | G05B 15/02 |
| 2017/0374718 A1* | 12/2017 | Fang | H05B 37/0272 |
| 2018/0027626 A1 | 1/2018 | Wang et al. | |
| 2018/0041681 A1* | 2/2018 | Pope | H04N 5/2351 |
| 2018/0177026 A1* | 6/2018 | Bowser | H05B 33/0827 |
| 2018/0192498 A1* | 7/2018 | Lin | H05B 37/0254 |

\* cited by examiner

SOLID STATE LUMINAIRE WITH FIELD-CONFIGURABLE CCT AND/OR LUMINOSITY

FIELD OF INVENTION

The present invention relates generally to solid state lighting, and in particular to a field-configurable luminaire wherein luminous characteristics are selected after manufacture, at or prior to sale.

BACKGROUND

Solid state lighting devices are well known in the art, and are rapidly replacing conventional lighting sources, such as incandescent bulbs and fluorescent lighting fixtures. As used herein, the term Light Emitting Device (LED) means a solid state lighting device, such as a light emitting diode or laser diode. The numerous advantages of LEDs over conventional lighting sources include: LEDs consume less energy to produce comparable lighting; LEDs do not generate heat on the scale of incandescent lights or even the ballasts of fluorescent fixtures; LEDs are generally fabricated with plastic or epoxy housing and lenses, and hence are more rugged; LEDs last longer than conventional light sources; LEDs do not contain toxic gases which may be released on breakage; and LEDs require no "warm-up" and may be cycled at high frequencies.

Due to these advantages, light fixtures, also known as luminaires, became commercially available soon after the development of practical white light LEDs. These luminaires typically assemble a homogenous plurality of white LEDs in series into a single string, driven by a power supply that provides a substantially constant drive current. Many such power supplies include a "dimming" or brightness control feature, whereby the constant output current can be adjusted, either in discrete steps, or continuously over a range, to drive the LED string at different levels of illumination (also referred to herein as luminous flux). As used herein, the term "constant current power supply" refers to a power supply circuit that attempts to output a substantially constant current to a load, at any particular selected drive (brightness) level.

Light sources—both individual LEDs and luminaires constructed with them—may be characterized by various luminous characteristics, such as Correlated Color Temperature (CCT), and luminous flux.

The chromaticity, or color, of a light source may be expressed as a "color point" in a coordinate system of a color space, such as a tristimulus value (X, Y, Z) or the color coordinates (CCx, CCy) on a chromaticity diagram. Alternatively, because a black-body radiator emits a range of colors depending on its temperature, color information may also be expressed as a CCT, which is the temperature (on the Kelvin scale) at which the heated black-body radiator matches the color of the light source. The CCT of white light sources ranges from around 2700 K to 6500 K. Light at the lower end, around 2700 K, has a yellowish color (referred to as "warm" white light), and light at the upper end, around 6500 K, has a blueish color (referred to as "cool" white light).

The luminous flux of a light source refers to the intensity of its illumination, measured in lumens, where one lumen is the amount of light emitted per second in a unit solid angle of one steradian from a uniform source of one candela. The luminous flux of most LEDs varies with the current with which it is driven; however, LEDs may be manufactured to different sizes and hence may have different luminous flux capabilities.

Early LED luminaires typically included a single string of homogeneous white light LEDs, all outputting the same luminous characteristics, and all driven together in series. For example, all LEDs in such a luminaire may be white Light Emitting Diodes. A white LED is structurally a blue LED that includes a phosphor which absorbs some of the high-energy blue light and emits lower-energy yellow, green, and red light. The phosphor-converted light mixes with an unchanged portion of the blue light, producing perceptually white light. The single-string luminaire has a set CCT, depending on the particular LEDs used, which is typically on the cool end of the spectrum.

More modern LED luminaires mix, or blend, the light from a plurality of heterogeneous strings of LEDs, in fixed or controllable proportions. For example, one string may comprise Blue-Shifted-Yellow (BSY) LEDs. Similarly to the white LEDs described above, BSY LEDs emit blue light, and phosphors shift some of the light to the yellow range of the spectrum; the combination of blue and yellow produces a cool white light. Another string may comprise red or red-orange (RDO) LEDs, which produce a warmer CCT of light.

The intensities of the strings, and hence the CCT of blended light output by the luminaire, may be independently controlled by altering the current supplied to each string. The ratio of intensities may be predetermined, user programmed, or dynamically changed in response to various inputs or sensed conditions. The cost of the luminaire product generally scales according to these options. That is, a fixed (predetermined) CCT luminaire is generally the least expensive option; user control adds cost, as it often requires multiple-channel drivers; and the "smart" luminaires that alter their lighting automatically are the most expensive. The same maxim is true for fixed/controllable/automatic luminosity. In many industrial, commercial, and office environments, the lower cost option—predetermined CCT and luminosity—comprises the bulk of the lighting market. However, different applications, environmental conditions, customer preferences, and the like lead to a large number of permutations of different predetermined values of CCT and/or luminosity. Distributors must thus maintain a large stock of luminaire products, the only difference among which are the predetermined values of CCT and luminosity, both of which are controlled by the level and ratio of drive current supplied to heterogeneous strings of LEDs.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a single luminaire product is field-configurable to at least a plurality of discrete CCT and luminosity settings. A field-actuated control circuit controls a configuration circuit, which controls the drive current from a power supply to selected ones, or in selected ratios to multiple ones, of heterogeneous LED strings, to control the CCT of the luminaire. The control circuit may also control the power supply, to select an overall level of drive current, which determines the luminosity of the luminaire. In one embodiment, inputs to the field-actuated control circuit are input from exterior to the luminaire product packaging, such as by switches provided on or connectable to the packaging, or wirelessly. Embodiments of the present invention allow a distributor to order and stock a large inventory of substantially identical luminaires from the manufacturer, yet still offer customers a variety of different CCT/luminosity products. Prior to sale, any number of luminaires may be retrieved from the stock of substantially identical luminaires, and customized to a desired CCT/luminosity combination, without opening the product packaging.

One embodiment relates to a field-configurable solid state luminaire. The luminaire includes a power supply adapted to output a total drive current, and first and second strings of light emitting devices (LED). Each LED string generates light having a different coordinated color temperature (CCT). The luminaire includes a current ratio control circuit. The a current ratio control circuit is adapted to selectively control the current through one or both of the first and second LED strings according to a selectable ratio. The luminaire further includes a field-actuated controller adapted to control the power supply to set the maximum luminosity output by the luminaire, and further adapted to control the current ratio control circuit to set the CCT output by the luminaire.

Another embodiment relates to a method of setting the coordinated color temperature (CCT) of a field-configurable solid state luminaire prior to sale of the product. The luminaire includes a power supply and at least first and second strings of light emitting devices (LED), each generating light having a different CCT. The luminaire also includes at least one balanced current regulator configured to divide drive current from the power supply through the first and second LED strings in a predetermined ratio. A switch control is input to a field-actuated control circuit. The control circuit is adapted control an n-pole, m-throw functionality switching circuit, where n is the number of LED strings and each LED string is connected to a different pole, and m is n plus the number of balanced current regulators. A first throw of the switching circuit is configured to direct current through the first LED string only. A second throw of the switching circuit is configured to direct current through the second LED string only. A third throw of the switching circuit is configured to connect the first and second LED strings to the balanced current regulator.

Another embodiment relates to a method of setting a coordinated color temperature (CCT) and a maximum luminosity output by a field-configurable solid state luminaire, after its product packaging following manufacture. The luminaire includes a variable power supply and first and second strings of light emitting devices (LED). Each LED string generates light having a different CCT. The luminaire further includes a current ratio control circuit adapted to selectively control the current through one or both of the first and second LED strings according to a selectable ratio, and a field-actuated controller. An indication of a desired maximum output luminosity of the solid state luminaire is inputting to the field-actuated controller. An indication of a desired output CCT of the solid state luminaire is also input to the field-actuated controller.

Yet another embodiment relates to a method of configuring a luminaire product prior to sale. A plurality of substantially identical field-configurable solid state luminaire products is received from a manufacturer and stored. A customer's order for a number of luminaires and at least a desired coordinated color temperature (CCT) for each is received. The desired number of luminaires is retrieved from the stored, substantially identical field-configurable solid state luminaires. An indication of a desired output CCT of the solid state luminaire is input, from external to the luminaire product packaging, to a field-actuated control circuit of the luminaire. The indication is operative to adapt the luminaire to provide the desired CCT when installed and in use.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
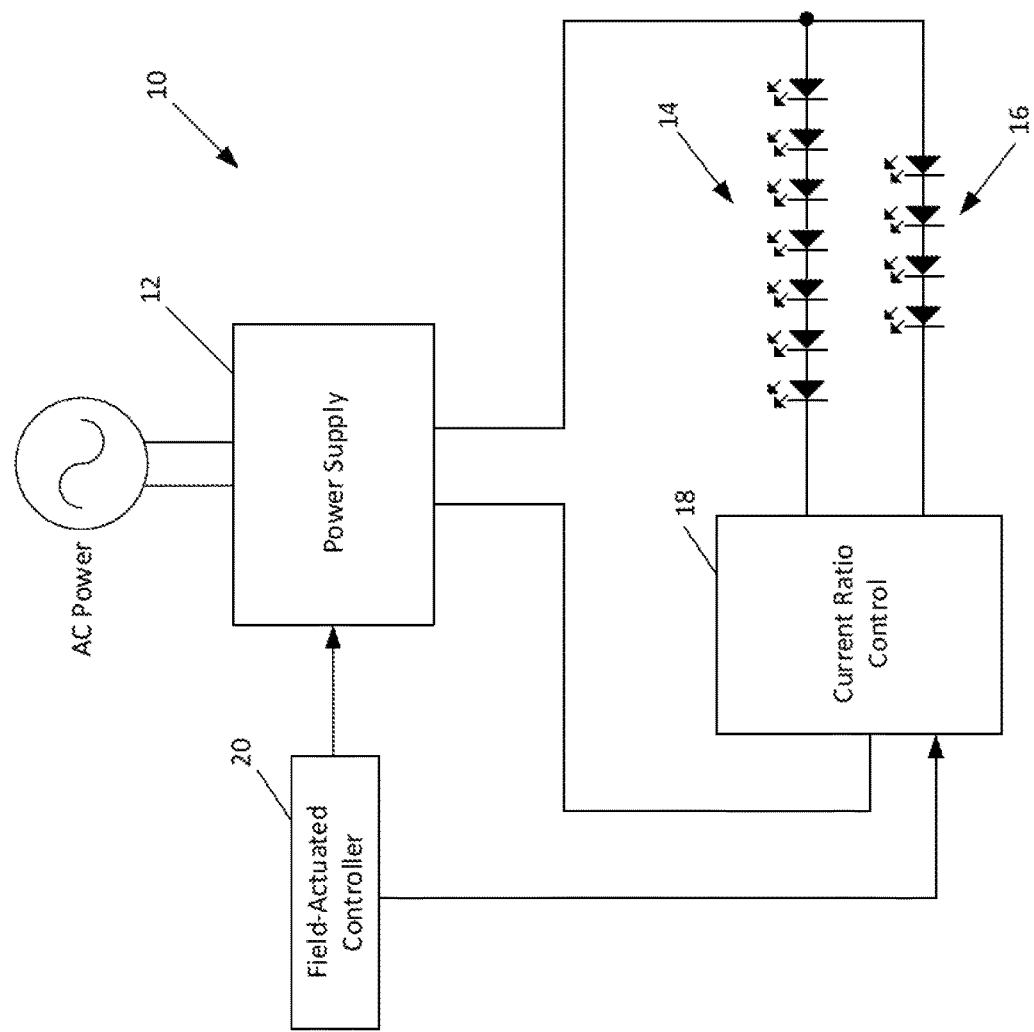
FIG. 1 is a block diagram of a field-configurable solid state luminaire having a controllable CCT and luminosity.

FIG. 1 depicts a block diagram of a field-configurable solid state luminaire 10. The luminaire 10 includes a power supply 12, first 14 and second 16 strings of LEDs, a current ratio control circuit 18, and a field-actuated controller 20. The power supply 12, which may for example may comprise a constant current power supply, converts AC power to a steady DC drive current. The constant current power supply may be variable—by which it is meant that a maximum drive current output by the power supply can be selectively varied, either continuously or in discrete steps, through a range. However, at any given maximum drive current output level, the power supply maintains that selected current at a constant value. In some embodiments, the drive current output by the power supply 12 may be controllable from zero through a configured maximum level by a dimming circuit, such as by using a 0-10V dimming controller. The power supply may include a Power Factor Correction (PFC) circuit to achieve a high Power Factor (PF).

A first string 14 of LEDs generates light having a first coordinated color temperature (CCT). For example, the first LED string 14 may comprise Blue-Shifted-Yellow (BSY) LEDs. A second string 16 of LEDs generates light having a second CCT. For example, the second LED string 16 may comprise red or red-orange (RDO) LEDs. The first 14 and second 16 LED strings are connected in parallel. In general, the first 14 and second 16 LED strings may comprise different numbers of LEDs, as well as different types. While each LED string 14, 16 may, in general, include different type LEDs, in one embodiment, each LED string 14, 16 is homogenous in its LED types, while the LED strings 14, 16, are heterogeneous to each other in LED type (and hence CCT). In practice, the physical location of individual LEDs in the luminaire 10 may alternate between those in the first 14 and second 16 LED strings, so as to better blend their light outputs.

A current ratio control circuit 18 determines a ratio of currents from the power supply 12 that flow through each of the first 14 and second 16 LED strings. By controlling the ratio of currents, a desired overall, blended CCT of the field-configurable solid state luminaire may be selected across a broad spectrum of CCT values. Several embodiments of the current ratio control circuit 18 are disclosed and claimed herein.

Figure 2:
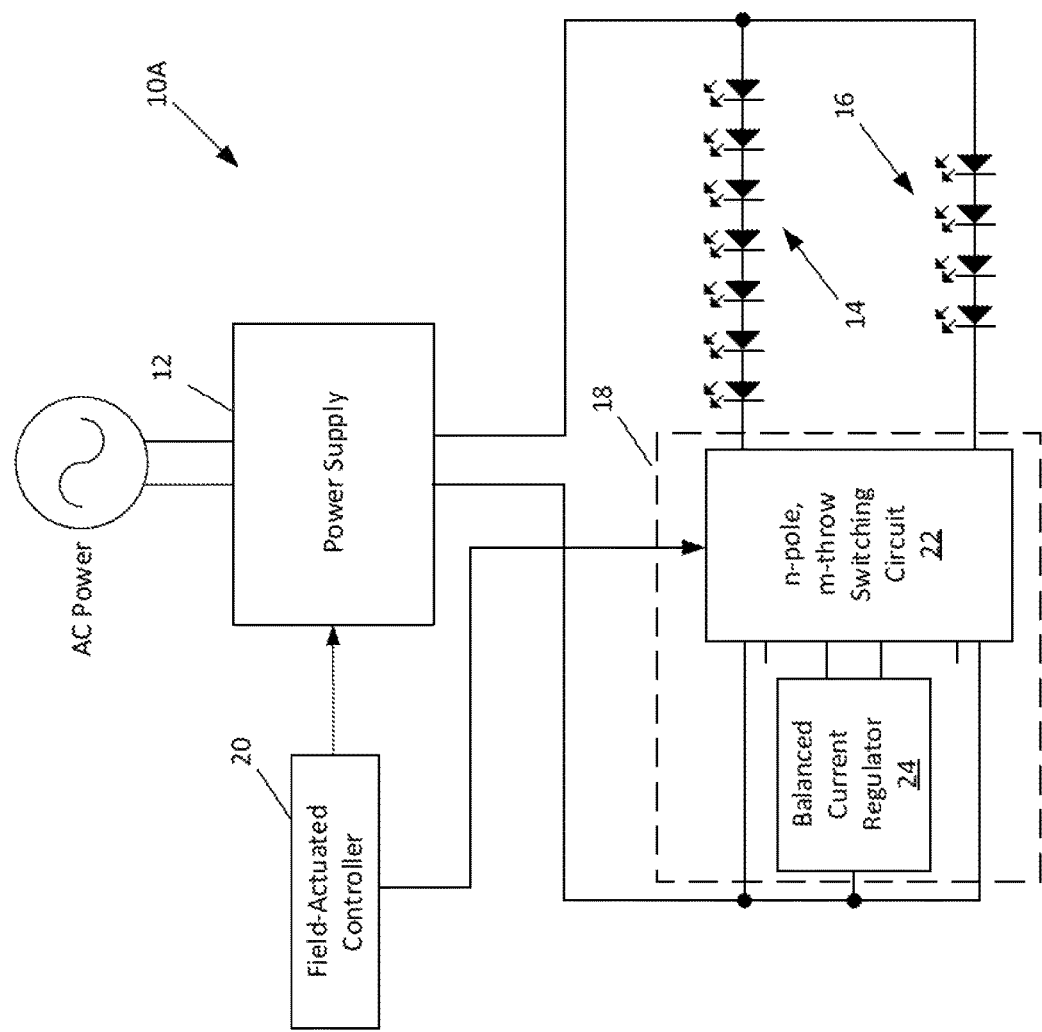
FIG. 2 is a circuit schematic diagram of a field-configurable solid state luminaire according to one embodiment.

FIG. 2 depicts one embodiment of a field-configurable solid state luminaire 10A, in which the current ratio control circuit 18 comprises a combination of an n-pole, m-throw switching circuit 22 and at least one balanced current regulator 24. As well known in the art, the number of "poles" of a switch is the number of inputs, and the number of "throws" is the number of outputs to which the poles can be connected. Multi-pole switches switch all poles together—that is, the poles are "ganged." In embodiments of the present invention, the number of poles n is equal to the number of LED strings 14, 16, and each LED string 14, 16 is connected to a different pole of the switching circuit 22. In the embodiment depicted in FIG. 2, n=2. In embodiments of the present invention, the number of throws m is n greater than the number of balanced current regulators 24. In the embodiment depicted in FIG. 2, m=2+1=3. The function and operation of the switching circuit 22 is described in greater detail below, with reference to FIG. 3.

A balanced current regulator 24 is a known circuit or component, which divides drive current between two (or more) strings 14, 16 of LEDs in a predetermined ratio. The ratio may be determined by the values of external resistors connected to the balanced current regulator 24. A suitable balanced current regulator 24 is the LM3466 device from Texas Instruments of Dallas, Tex. Alternatively, a balanced current regulator 24 may be constructed, e.g., using current mirror circuits, as known by those of skill in the art.

Operation of the power supply 12 and current ratio control circuit 18 are controlled by a field-actuated controller 20. As used herein, "field-actuated" means that the controller 20 accepts inputs, and controls the maximum level of drive current applied to the LED strings 14, 16 (to control maximum output luminosity) and the ratio of current through the LED strings 14, 16 (to control output CCT), after a field-configurable solid state luminaire product has left the factory. For example, inputs to the field-actuated controller 20 may be provided by a distributor, to "customize" the maximum luminosity and CCT of a field-configurable solid state luminaire product prior to sale to a customer. In this regard, in some embodiments the field-actuated control inputs are provided externally of product packing in which the field-configurable solid state luminaire product is packaged. For example, the controls may be input wirelessly, or by switches, buttons, or the like extending through the product packaging (or connectable by one or more connectors extending through the packaging). In some embodiments, the customer may further be able to provide maximum luminosity and CCT control inputs to the field-actuated controller 20 prior to installation, or even during the luminaire product's use when installed.

FIG. 2 depicts three, two-line outputs from the switching circuit 22, corresponding to three throws. A first throw of the switching circuit 22 is configured to direct all drive current from the power supply 12 through the first LED string 14 only. A second throw of the switching circuit 22 is configured to direct all drive current through the second LED string 16 only. Finally, a third throw of the switching circuit 22 is configured to connect both the first 14 and second 16 LED strings to the balanced current regulator 24. The balanced current regulator 24 is configured to divide the drive current through the first 14 and second 16 LED strings in a predetermined ratio, which may for example be set by the values of external resistors.

For a given level of drive current from the power supply 12, by controlling the switching circuit 22, the luminaire 10A of FIG. 2 can be configured to output one of three CCT values—that of the, e.g., BSY LEDs of the first string 14, that of the, e.g., RDO LEDs of the second string 16, or an intermediate CCT determined by the predetermined current ratio set by the balanced current regulator 24.

The field-actuated controller 20 is also adapted to control the power supply 12 to output two or more different values of maximum drive current. For, e.g., two levels of maximum drive current, the luminaire 10A may be field-configured into any one of six different CCT and maximum luminosity combinations, simply by providing the correct inputs to the field-actuated controller 20. In one embodiment, these six permutations are predetermined and ordered, and input to the field-actuated controller 20 comprises simply selecting one of the six choices. This may comprise, for example, setting a six-position selector switch to select the desired permutation. Alternatively, three DIP switches provide up to eight discrete selections. In either case, the luminaire 10A packaging, as the product leaves the factory, may include a window or opening, making the inputs to the field-actuated controller 20 accessible without opening the packaging or removing the product therefrom. Alternatively, a plug or connector may be accessible, and an appropriate input device attached to the connector for field-configuration. In one embodiment, the field-actuated controller 20 includes a wireless receiver (not shown), such as a Near Field Communications (NFC), Bluetooth,® or Wi-Fi® receiver. Inexpensive, integrated circuit receivers for numerous wireless standards are readily available, inexpensive, and easily integrated. Use of wireless communications, with an appropriate anti-collision protocol, allows an entire pallet of field-configurable solid state luminaires 10 to be field-configured at once.

Figure 3:
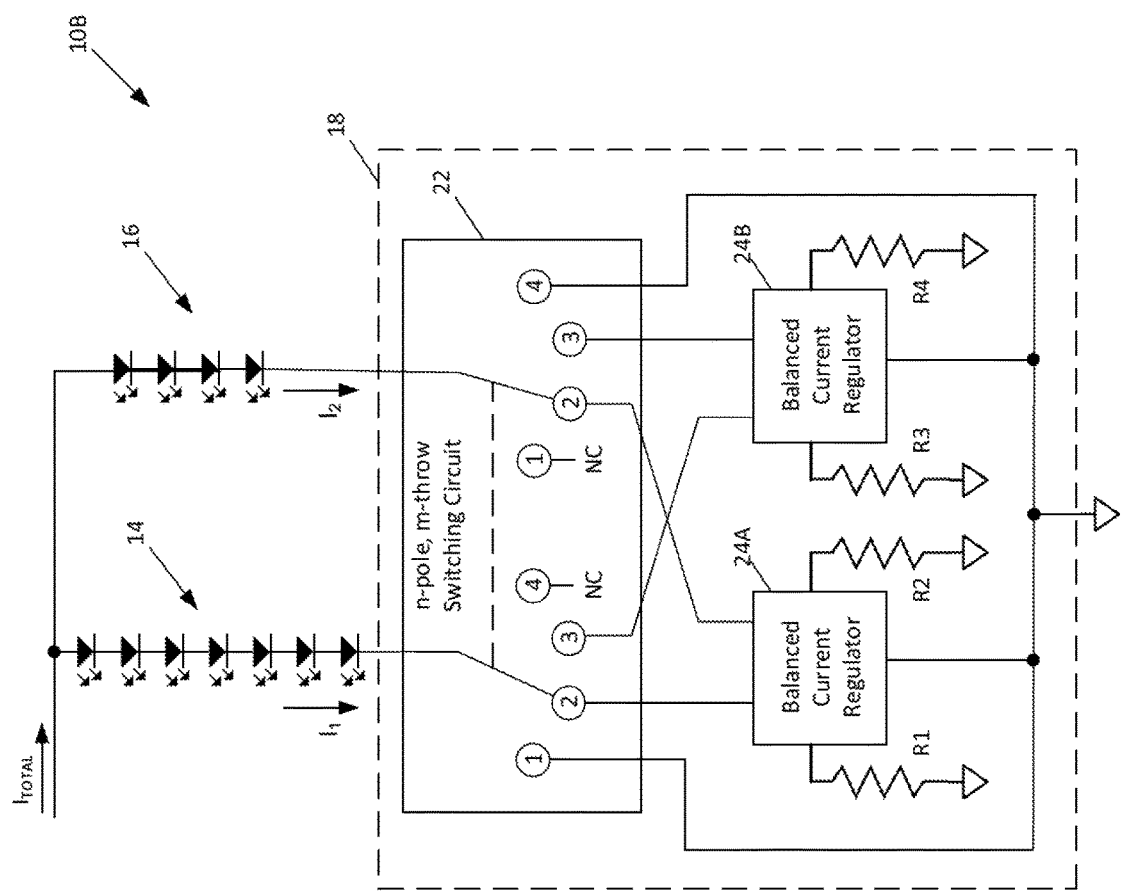
FIG. 3 is a detailed view of the switching circuit and balanced current regulators of a field-configurable solid state luminaire according to one embodiment.

FIG. 3 depicts the LED strings 14, 16 and current ratio control circuit 18 of a field-configurable solid state luminaire 10B, according to another embodiment. The luminaire 10B includes first 14 and second 16 heterogeneous strings of LEDs, as described above. In this embodiment of the luminaire 10B, the current ratio control circuit 18 includes a switching circuit 22 and two balanced current regulators 24A and 24B. Hence, the switching circuit 22 has a 2-pole, 4-throw functionality. Each of the first 14 and second 16 LED strings is connected to a pole of the switching circuit 22. As indicated by the dashed line, the two poles are ganged together, meaning that at any time, the poles are connected to corresponding terminals of the same selected throw, or output position (numbered 1 through 4 in FIG. 3).

The first throw of the switching circuit 22, labeled as #1 in FIG. 3, connects the first LED string 14 to ground, and connects the second LED string 16 to a Not Connected (NC) terminal, and thus an open circuit. In this throw, all of the drive current $I_{TOTAL}$ flows through the first LED string 14 only. The luminaire thus has the CCT of the first LED string 14, which may for example be a cool white. Similarly, the last throw of the switching circuit 22, labeled as #4 in FIG. 3, connects the second LED string 16 to ground, and connects the first LED string 14 to a NC terminal, and thus an open circuit. In this throw, all of the drive current $I_{TOTAL}$ flows through the second LED string 16 only, and the luminaire has the CCT of the second LED string 16, which may for example be a warm color, e.g., orange or red.

As depicted in FIG. 3, the second throw of the switching circuit 22, labeled as #2, connects both the first LED string 14 and the second LED string 16 to the first balanced current regulator 24A. The balanced current regulator 24A is configured to divide the drive current $I_{TOTAL}$ between the first 14 and second 16 LED strings in a predetermined ratio, determined by the values of resistors R1 and R2. That is, $$I_{TOTAL} = I_1 + I_2. \text{ Also, } \frac{I_1}{I_2} = \frac{R1}{R2}.$$

Similarly, the third throw of the switching circuit 22, labeled as #3, connects both the first LED string 14 and the second LED string 16 to the second balanced current regulator 24B. This balanced current regulator 24B is configured to divide the drive current $I_{TOTAL}$ between the first 14 and second 16 LED strings in a predetermined ratio, determined by the values of resistors R3 and R4, where $$\frac{I_1}{I_2} = \frac{R3}{R4}.$$

In one embodiment, the values of R1, R2, R3, and R4 are selected such that the predetermined current ratio of balanced current regulator 24A is substantially 3:1, and the predetermined current ratio of balanced current regulator 24B is substantially 1:3.

The field-configurable solid state luminaire 10B depicted in FIG. 3 can thus be field-configured to any of four CCTs: that of the first LED string 14; that of the second LED string 16; a 3:1 ratio of the first 14 to second 16 LED string; and a 1:3 ratio of the first 14 to second 16 LED string. If the power supply 12 has two selectable maximum drive current levels, the luminaire 10B is field-configurable into one of eight different CCT and maximum luminosity products. The field-configurable solid state luminaire 10B can thus dramatically reduce the number of individual luminaire products a distributor must stock, as eight different end products can be field-configured from a common stock of substantially identical field-configurable solid state luminaires 10B.

In general, the switching circuit 22 may comprise any form of electrical switching that achieves or emulates the functionality of an n-pole, m-throw switch. The switching circuit 22 may comprise a mechanical switch, or may be implemented as individual switches controlled by a control circuit (either the field-actuated controller 20 or a control circuit within the switching circuit 22). The individual switches may comprise electro-mechanical switches, such as solenoids or relays, or may comprise solid state switches, such as transistors. Alternatively, the switching circuit 22 may comprise an appropriately configured and programmed state machine, field programmable gate array (FPGA), or programmable circuit (e.g., microcontroller, processor, digital signal processor (DSP), or the like).

Figure 4:
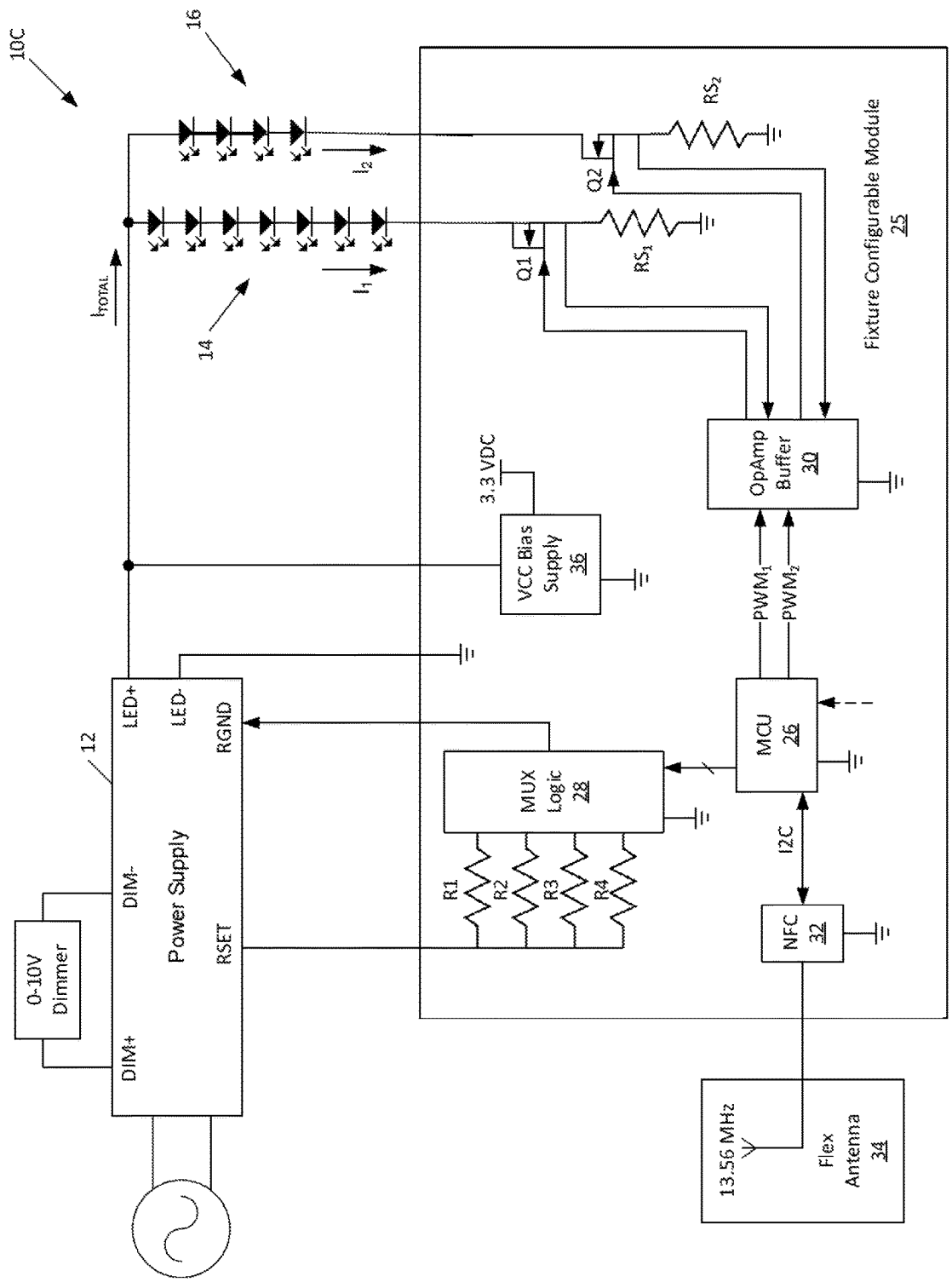
FIG. 4 is a circuit schematic diagram of one embodiment of a field-configurable solid state luminaire.

FIG. 4 depicts another embodiment of a field-configurable solid state luminaire 10C. The field-configurable solid state luminaire 10C includes a variable, constant current power supply 12, first 14 and second 16 heterogeneous strings of LEDs, and Fixture Configurable Module (FCM) 25. The FCM 25 includes the functionality of both the current ratio control circuit 18 and the field-actuated controller 20 of FIG. 1. The FCM 25 includes a MicroController Unit (MCU) 26, multiplexer (MUX) logic 28, resistors R1-R4, at least a dual operational amplifier buffer circuit 30, transistors Q1, Q2, sense resistors RS1, RS2, a Near Field Communications (NFC) receiver 32, and VCC bias supply 36.

The MCU 26 controls both the output CCT and the maximum output luminosity of the field-configurable solid state luminaire 10C. The MCU 26 may comprise a state machine, field programmable logic (FPGA), a microprocessor or DSP, or the like. Although not depicted in FIG. 4, those of skill in the art understand the MCU 26 will access either internal or external memory, which stores executable code operative to cause the MCU 26 to perform the control functions described herein.

The MCU 26 controls the maximum output luminosity of the field-configurable solid state luminaire 10C by selecting a resistance value applied across the maximum drive current control inputs RSET and RGND of the power supply 12. Note that FIG. 4 depicts a 0-10V dimmer connected to the power supply 12. As well known in the art, this provides for user dimming of the luminaire, in some higher-end products. In these embodiments, the MCU 26 controls the maximum output luminosity of the field-configurable luminaire 10C—a user may utilize the 0-10V dimmer control to select a luminosity below that level. In embodiments without the 0-10V dimmer control, the MCU 26 determines the output luminosity of the field-configurable luminaire 10C.

In either case, a plurality of resistors R1-R4, each having a different value, are connected on one side to the RSET input, and on the other side to different inputs of the MUX logic circuit 28. As well known in the art, a MUX functions to connect one of a plurality of inputs to a single output, in response to a control input (typically, a plurality of digital bits). As shown in FIG. 4, the MCU 26 generates the control input to direct the MUX logic 28 to select one of the resistances R1, R2, R3, or R4, to appear at the MUX output, and thus effectively applies that resistance across the RSET/RGND inputs. In this manner, the MCU 26 selects one of four different values of a maximum total drive current $I_{TOTAL}$ output by the power supply 12. Of course, in any given implementation, more or fewer resistances R1-R4 may be employed, providing a finer or coarser granularity of maximum drive current control. In other embodiments, a different form of variable resistance, controlled by the MCU 26, may be employed in lieu of the MUX logic 28 and discrete resistors R1-R4.

The total drive current $I_{TOTAL}$ output by the power supply 12 is split into two currents: flowing through the first LED string 14, and $I_2$ flowing through the second LED string 16. The MCU 26 controls the ratio of the currents $I_1$, $I_2$, to control the output CCT of the field-configurable solid state luminaire 10C. Each LED string 14, 16 is connected in series with a transistor Q1, Q2, such as a MOSFET transistor, and a sense resistor $RS_1$, $RS_2$, which are connected to ground. The transistors Q1, Q2 are independently controlled by analog reference signals, generated by the operational amplifier buffer circuit 30 in response to Pulse Width Modulated (PWM) control signals $PWM_1$, $PWM_2$ output by the MCU 26. For real-time feedback of the $I_1$, $I_2$, currents (the ratio of which determines the output CCT of the field-configurable solid state luminaire 10C), the voltage across each sense resistor $RS_1$, $RS_2$ is sensed and fed back to the operational amplifier buffer circuit 30. As known in the art, the voltage across a sense resistor $RS_1$, $RS_2$ connected to ground is proportional to the current $I_1$, $I_2$ through the respective first 14 or second 16 LED string.

To establish a particular ratio of currents $I_1$, $I_2$ in the LED strings 14, 16, the MCU controls the duty cycles of the PWM control signals $PWM_1$, $PWM_2$. These are converted to analog reference signals by the operational amplifier buffer circuit 30. The analog reference signals, in turn, control the transistors Q1, Q2 to limit the respective currents $I_1$, $I_2$. The conversion of PWM control signals to the analog domain improves low-end dimming—for example, by eliminating any flicker that may be visible by switching the transistors ON and OFF at low PWM duty cycles. In other embodiments (not shown) the transistors Q1, Q1 may be driven directly by PWM control signals $PWM_1$, $PWM_2$, with feedback from the current sense resistors $RS_1$, $RS_2$ going directly to the MCU 26.

By independently controlling the duty cycles of PWM control signals $PWM_1$, $PWM_2$, the MCU 26 may establish any desired ratio of the currents $I_1$, $I_2$—with either of the LED strings 14, 16, receiving from 0% to 100% of the total drive current $I_{TOTAL}$. That is, as with the embodiments 10A, 10B discussed above, either LED string 14, 16 may receive the entire total drive current $I_{TOTAL}$. Alternatively, the current $I_{TOTAL}$ may be divided among the LED strings 14, 16 in any incremental ratio—in contrast to the embodiments 10A, 10B, the embodiment 10C is not limited to an integer number of predetermined current ratios. The PMW control signals are normally set to be complimentary to each other—that is, if $PMW_1$ has a duty cycle of 75%, then $PMW_2$ would be set to a duty cycle of 25%. Furthermore, the embodiment 10C has the advantage that the current ratio may be gradually changed, or "faded," from one ratio to another (i.e., between output CCT values), as opposed to the embodiments 10A, 10B, wherein hard switching requires abrupt changes to the CCT output, if it is adjusted while in use.

In the embodiment 10C depicted in FIG. 4, the MCU 26 receives input—such as indications of desired output CCT and/or maximum output luminosity—wirelessly. A Near Field Communications (NFC) receiver 32 receives input from an antenna 34. The NFC receiver 32 communications with the MCU over a conventional interface, such as the Inter-IC (I2C) bus, a two-wire interface optimized for inter-IC communications. Of course, other communications protocols may be used. In other embodiments, as indicated by the dashed-line input, the MCU 26 may receive indications of desired output CCT and/or maximum output luminosity from other sources, such as buttons, switches, or similar input facilities made available through the field-configurable solid state luminaire product packaging.

In some embodiments, the FCM 25 includes a VCC bias supply 36, powered by the drive current output of the power supply 12. The VCC bias supply 36 generates a regulated power supply, such as 3.3. VDC, to power the various ICs and other circuits in the FCM 25. These circuits are referenced to the ground of the power supply 12.

In general, a field-configurable solid state luminaire 10A, 10B, 10C may include any number of LED strings 14, 16 greater than or equal to two. In embodiments 10A and 10B, it may include any number of balanced current regulators 24 greater than or equal to one, with corresponding changes to the configuration of the n-pole, m-throw switching circuit 22, as described above.

Figure 5:
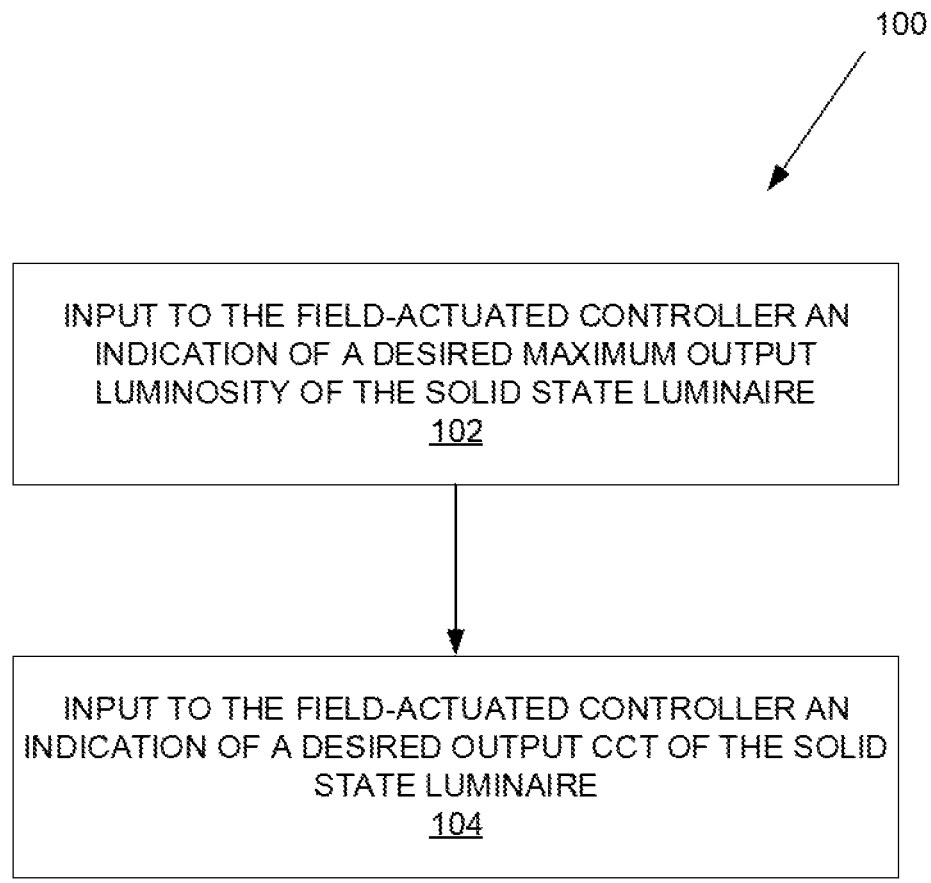
FIG. 5 is a flow diagram of a method of inputting a desired CCT and maximum luminosity of a field-configurable solid state luminaire prior to sale of the product.

FIG. 5 depicts a method 100 of setting a CCT and a maximum luminosity output by a field-configurable solid state luminaire 10A, 10B, 10C, after its packaging following manufacture. The field-configurable solid state luminaire 10A, 10B, 10C includes a variable power supply 12, first 14 and second 16 strings of LEDs, where each LED string 14, 16 generates light having a different CCT. The field-configurable solid state luminaire 10A, 10B, 10C further includes a current ratio control circuit 18 adapted to selectively control the current through one or both of the first 14 and second 16 LED strings according to a selectable ratio. The field-configurable solid state luminaire 10A, 10B, 10C also includes a field-actuated controller 20. The method comprises inputting, to the field-actuated controller 20, an indication of a desired maximum output luminosity of the solid state luminaire 10A, 10B, 10C (block 102). The method further comprises inputting, to the field-actuated controller 20, an indication of a desired output CCT of the solid state luminaire 10A, 10B, 10C (block 104).

The ability to control the maximum output luminosity and CCT of a field-configurable luminaire 10A, 10B, 10C in the field, such as by a user upon or following installation, is a useful feature, as provides the user with the ability to customize some aspects of the lighting. However, a significant advantage of this field-configurability is in product distribution and sales, where it can significantly simplify inventory control and SKU management. As described above, if a luminaire of a particular size, shape, etc. is available from the manufacturer in four CCT and two maximum luminosity configurations, a distributor or retailer must stock eight different products. By utilizing the field-configurability of embodiments of the present invention, the number of different products for which inventory must be maintained is reduced to one, while still offering customers the full line of eight products.

Figure 6:
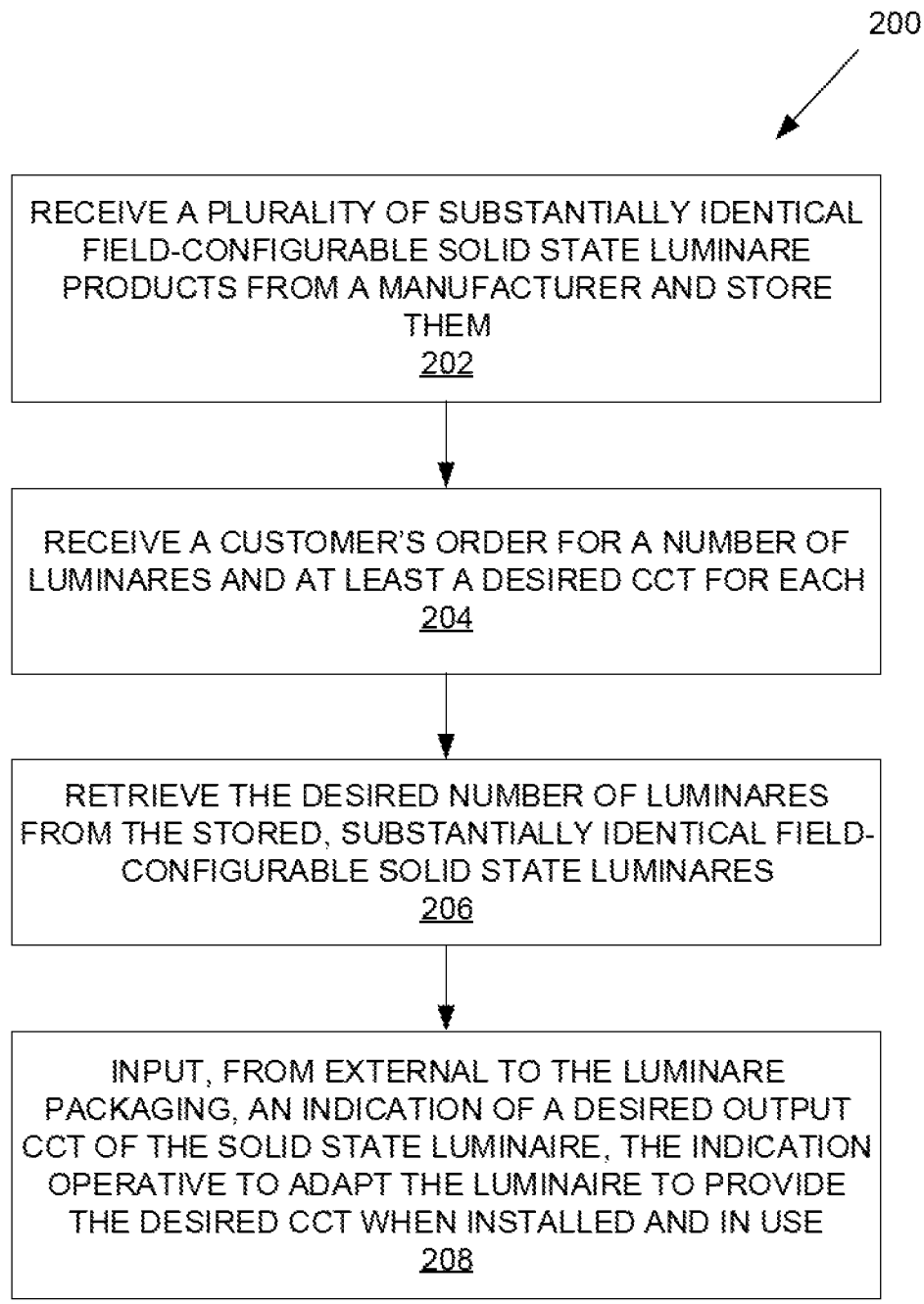
FIG. 6 is a flow diagram of a method of configuring a field-configurable solid state luminaire product prior to its sale.

FIG. 6 depicts a method 200 of configuring a luminaire product prior to sale. A plurality of substantially identical field-configurable solid state luminaires 10A, 10B, 10C is received from a manufacturer and stored (block 202). A customer's order for a number of luminaires 10A, 10B, 10C and at least a desired CCT for each is received (block 204). The desired number of luminaires 10A, 10B, 10C is retrieved from the stored, substantially identical field-configurable solid state luminaires 10A, 10B, 10C (block 206). An indication of a desired output CCT of the solid state luminaire 10A, 10B, 10C is input, from external to the luminaire 10A, 10B, 10C product packaging (block 208). The indication is operative to adapt the luminaire 10A, 10B, 10C to provide the desired CCT when installed and in use. In some embodiments, the maximum level of drive current, and hence the maximum luminosity of the luminaire 10A, 10B, 10C, may also be field-selected.

FIGS. 1-4 depict embodiments of a field-configurable solid state luminaire 10 having first 14 and second 16 strings of LEDs, wherein a field-actuated controller 20 controls a current ratio control circuit 18 to vary the ratio of current in each LED string 14, 16. In these embodiments, the LED strings 14, 16 are envisioned to comprise homogeneous LEDs (that is, LEDs outputting the same CCT), with the LED strings 14, 16 heterogeneous from each other, at least with respect to CCT. However, the present invention is not limited to these configurations. Those of skill in the art will readily appreciate that three, four, or more LED strings 14, 16 may be employed, offering a greater variety of CCT options and/or finer granularity in selecting a desired CCT outputs. In such embodiments, each LED string 14, 16 may output a different CCT, and controlling the ratio of currents alters the CCT output of the luminaire 10. In other embodiments, two or more of the LED strings 14, 16 may output the same CCT, and adjusting the ratio of currents may alter the intensity of the overall light output, or the intensity of one component CCT, of the luminaire 10. In still other embodiments, the number of LEDs operative in each string 14, 16 may be controlled by the current ratio control circuit 18. For example, one or more taps along an LED string 14, 16, may connect to ground via a controlled switch, whereby in use, the switches may be controlled to pass current through some of the LEDs in a string 14, 16, and then shut the current to ground, bypassing the remaining LEDs in the string 14, 16. The LEDs in such strings 14, 16 may be homogeneous or heterogeneous with respect to CCT. For example, a single LED string 14, 16 may include both BSY and RDO LEDs, the mix of which may be altered by selectively either driving all LEDs in the string or shunting current to ground to bypass some of the LEDs. In all of the embodiments described herein, control of the CCT and/or luminosity output by the field-configurable solid state luminaire 10 is controlled by a field-actuated controller 20, and may be altered after the luminaire 10 has left the factory.

Embodiments of the present invention present numerous advantages over the prior art. A field-configurable solid state luminaire 10A, 10B, 10C may dramatically simplify inventory control by allowing a large number of differentiated final products to be configured from a common stock of substantially identical field-configurable luminaires 10A, 10B, 10C. In various embodiments, both CCT and maximum luminosity may be field-configurable. As a further advantage, the customer or end user may be able to further adjust the CCT and/or maximum luminosity as required or desired.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A field-configurable solid state luminaire, comprising:
a power supply adapted to output a total drive current;
first and second strings of light emitting devices (LED), each string generating light having a different coordinated color temperature (CCT);
a current ratio control circuit adapted to selectively control current through one or both of the first and second LED strings according to a selectable ratio; and
a field-actuated controller adapted to control the power supply to set a maximum luminosity output by the luminaire, and further adapted to control the current ratio control circuit to set a CCT output by the luminaire, the field-actuated controller being further adapted to receive input from externally of product packaging into which the luminaire is packaged upon manufacture.

2. The luminaire of claim 1 wherein combinations of maximum luminosity and CCT are predetermined, and the field-actuated control circuit input comprises a selection of one such combination.

3. The luminaire of claim 2 further comprising a second balanced current regulator configured to divide the total drive current through the first and second LED strings in a different predetermined ratio than the first balanced current regulator, and wherein a fourth throw of the switching circuit is configured to connect the first and second LED strings to the second balanced current regulator.

4. The luminaire of claim 3 wherein the predetermined current ratio of the first balanced current regulator is substantially 3:1, and wherein the predetermined current ratio of the second balanced current regulator is substantially 1:3.

5. The luminaire of claim 1 wherein the current ratio control circuit comprises:
a first balanced current regulator configured to divide the total drive current through the first and second LED strings in a predetermined ratio; and
an n-pole, m-throw functionality switching circuit, where n is the number of LED strings and each LED string is connected to a different pole, and m is n plus the number of balanced current regulators;
wherein
a first throw of the switching circuit is configured to direct the total drive current through the first LED string only;
a second throw of the switching circuit is configured to direct the total drive current through the second LED string only; and
a third throw of the switching circuit is configured to connect the first and second LED strings to the first balanced current regulator.

6. The luminaire of claim 5 wherein the predetermined current ratio of each balanced current regulator is determined by the values of resistors connected to it.

7. The luminaire of claim 1 wherein a Fixture Configurable Module (FCM) comprises:
the current ratio control circuit; and
the field-actuated controller; and
wherein the field-actuated controller comprises one or more microcontrollers.

8. The luminaire of claim 7 further wherein the field-actuated controller further comprises a wireless receiver operatively connected to the microcontroller.

9. The luminaire of claim 8 further comprising first and second current sense resistors connected in series between the respective first and second transistors and ground, and wherein a voltage drop across each current sense resistor is an input to the respective first or second operational amplifier.

10. The luminaire of claim 7 wherein the current ratio control circuit comprises:
first and second transistors, each connected in series with the respective first or second LED string, wherein each transistor is adapted to limit current in the respective LED string in response to a respective first or second analog reference signal;

wherein the control circuit is adapted to generate first and second Pulse Width Modulation (PWM) control signals, wherein a ratio of currents in the first and second LED strings is determined by duty cycles of the first and second PWM control signals; and first and second operational amplifiers, each adapted to convert a respective first or second PWM signal to a respective first or second analog reference signal.

11. The luminaire of claim 7 wherein the field-actuated controller further comprises:
   a multiplexer circuit adapted to output a selected one of a plurality of inputs in response to a control input, the output being connected to a first drive current control input of the power supply; and
   a plurality of different valued resistors, each connected between a second drive current control input of the power supply and a separate input to the multiplexer;
   wherein the control circuit is adapted to generate a multiplexer control input operative to cause the multiplexer to select one of the resistors; and
   wherein the power supply is adapted to output a maximum total drive current in response to the resistance between the first and second drive current control inputs.

12. The luminaire of claim 1 further comprising a third string of LEDs, and wherein the current ratio control circuit is further adapted to selectively control current through one, two, or three of the first, second, and third LED strings according to a selectable ratio.

13. The luminaire of claim 1 wherein one or both of the first and second LED strings have one or more taps connected via a switch to ground, and wherein the current ratio control circuit is further adapted to selectively control the switches so as to alter the number of LEDs in each string through which current flows.

14. A method of setting a coordinated color temperature (CCT) and a maximum luminosity output by a field-configurable solid state luminaire, after its product packaging following manufacture and prior to the luminaire being removed from it product packaging, the luminaire including a variable power supply, first and second strings of light emitting devices (LED), each LED string generating light having a different CCT, a current ratio control circuit adapted to selectively control the current through one or both of the first and second LED strings according to a selectable ratio, and a field-actuated controller, comprising:
   inputting to the field-actuated controller, prior to the luminaire being removed from it product packaging, an indication of a desired maximum output luminosity of the solid state luminaire; and
   inputting to the field-actuated controller, prior to the luminaire being removed from it product packaging, an indication of a desired output CCT of the solid state luminaire.

15. The method of claim 14 wherein the inputting steps comprise inputting the indications wirelessly.

16. The method of claim 14 wherein inputting the indication of a desired output CCT of the solid state luminaire comprises inputting a switch control to a n-pole, m-throw functionality switching circuit, where n is the number of LED strings and each LED string is connected to a different pole, and m is n plus a number of balanced current regulators configured to divide the total drive current through the first and second LED strings in a predetermined ratio;
   whereby
      a first throw of the switching circuit is configured to direct current through the first LED string only;
      a second throw of the switching circuit is configured to direct current through the second LED string only; and
      a third throw of the switching circuit is configured to connect the first and second LED strings to a balanced current regulator.

17. The method of claim 16 wherein the luminaire includes two or more balanced current regulators, each configured to divide current through the first and second LED strings in different predetermined ratios, and wherein additional throws of the switching circuit are configured to connect the first and second LED strings to corresponding balanced current regulators.

18. The method of claim 14 wherein inputting to the field-actuated controller an indication of a desired output luminosity of the solid state luminaire comprises inputting an indication of a selection of resistance value to apply between drive current control inputs of the variable power supply.

19. The method of claim 14 wherein inputting to the field-actuated controller an indication of a desired output CCT of the solid state luminaire comprises inputting an indication of a ratio of current to be provided to the first and second LED strings.

20. A method of configuring a luminaire product prior to sale, comprising:
   receiving a plurality of substantially identical field-configurable solid state luminaire products from a manufacturer and storing them;
   receiving a customer's order for a number of luminaires and at least a desired coordinated color temperature (CCT) for each;
   retrieving the desired number of luminaires from the stored, substantially identical field-configurable solid state luminaires; and
   inputting, from external to the luminaire product packaging, an indication of a desired output CCT of the solid state luminaire, the indication operative to adapt the luminaire to provide the desired CCT when installed and in use.

21. The method of claim 20 wherein receiving a customer's order further comprises receiving a desired luminosity level for each luminaire, and further comprising inputting, from external to the luminaire product packaging, an indication of a desired output luminosity of the solid state luminaire, the indication operative to adapt the luminaire to provide the desired luminosity when installed and in use.

22. The method of claim 20 wherein inputting, from external to the luminaire product packaging, an indication of a desired output CCT of the solid state luminaire comprises inputting the indication wirelessly.

* * * * *